United States Patent
Meier et al.

(10) Patent No.: US 11,907,968 B1
(45) Date of Patent: *Feb. 20, 2024

(54) MEDIA EFFECTIVENESS

(71) Applicant: United Services Automobile Association (USAA), San Antonio, TX (US)

(72) Inventors: Richmond E. Meier, San Antonio, TX (US); Charles Holbrook Moore, San Antonio, TX (US); Douglas Michael Mowen, Shavano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,946

(22) Filed: Nov. 9, 2022

Related U.S. Application Data

(63) Continuation of application No. 15/724,484, filed on Oct. 4, 2017, now Pat. No. 11,521,230.

(60) Provisional application No. 62/403,769, filed on Oct. 4, 2016.

(51) Int. Cl.
    *G06Q 30/00* (2023.01)
    *G06Q 30/0242* (2023.01)
    *G06Q 30/0241* (2023.01)

(52) U.S. Cl.
    CPC ..... *G06Q 30/0243* (2013.01); *G06Q 30/0244* (2013.01); *G06Q 30/0277* (2013.01)

(58) Field of Classification Search
    None
    See application file for complete search history.

(56) References Cited

U.S. PATENT DOCUMENTS

| | | |
|---|---|---|
| 7,010,497 B1 | 3/2006 | Nyhan et al. |
| 7,254,547 B1 | 8/2007 | Beck et al. |
| 7,949,561 B2 | 5/2011 | Briggs |
| 8,775,603 B2 | 7/2014 | Hansen |
| 9,070,138 B2 | 6/2015 | Abraham |
| 11,521,230 B1 | 12/2022 | Meier et al. |
| 2002/0049968 A1 | 4/2002 | Wilson et al. |
| 2003/0014304 A1 | 1/2003 | Calvert et al. |
| 2008/0195664 A1 | 8/2008 | Maharajh et al. |
| 2008/0275980 A1 | 11/2008 | Hansen |
| 2009/0012839 A1 | 1/2009 | Fusillo |

(Continued)

FOREIGN PATENT DOCUMENTS

| | | |
|---|---|---|
| EP | 1074929 | 2/2001 |

OTHER PUBLICATIONS

Bruner, Rick E., and Marissa Gluck. "Best practices for optimizing web advertising effectiveness." DoubleClick Inc. White Paper (2006). (Year: 2006).

(Continued)

*Primary Examiner* — Michael Bekerman
(74) *Attorney, Agent, or Firm* — Fish & Richardson P.C.

(57) ABSTRACT

Methods, systems, and apparatus, including computer programs encoded on computer storage media, to improve the impact of digital media. One of these methods includes providing a non-affiliated advertisement to a plurality of users. The method includes receiving indications that a subset of the plurality of users have viewed the non-affiliated advertisement. The method also includes creating a control group for an advertisement from the subset of the plurality of users that received the non-affiliated advertisement.

20 Claims, 5 Drawing Sheets

(56) References Cited

U.S. PATENT DOCUMENTS

| | | |
|---|---|---|
| 2010/0049602 A1 | 2/2010 | Softky |
| 2012/0166520 A1 | 6/2012 | Lindsay et al. |
| 2013/0246160 A1 | 9/2013 | Farabat |
| 2013/0290096 A1 | 10/2013 | Lizotte |
| 2014/0114748 A1 | 4/2014 | Bruich |
| 2014/0278921 A1 | 9/2014 | Sankaran et al. |
| 2015/0317651 A1 | 11/2015 | Barker et al. |
| 2016/0335659 A1 | 11/2016 | Lewis et al. |
| 2017/0068987 A1 | 3/2017 | Levinson et al. |
| 2017/0140417 A1 | 5/2017 | Li et al. |
| 2017/0357998 A1 | 12/2017 | Scharf |
| 2017/0372352 A1 | 12/2017 | Riordan |

OTHER PUBLICATIONS

Burk, Scott. "A Better Statistical Method for NB Testing in Marketing Campaigns." Marketing Bulletin 17 (2006). (Year: 2006).
Woodside, Arch G. "Measuring advertising effectiveness in destination marketing strategies." Journal of Travel Research 29.2 (1990): 3-8. (Year: 1990).

MEDIA EFFECTIVENESS

CLAIM OF PRIORITY

This application is a continuation application of and claims priority under 35 U.S.C. § 120 to U.S. application Ser. No. 15/724,484, filed on Oct. 4, 2017, which claims priority to U.S. Provisional Patent Application Ser. No. 62/403,769, filed on Oct. 4, 2016, the entire contents of each of which are incorporated herein by reference.

BACKGROUND

Marketing is about communicating the value of a product, service or brand to customers or consumers for the purpose of promoting or selling that product, service, or brand. Marketing techniques include choosing target markets through market analysis and market segmentation. Marketing can also include understanding consumer behavior and advertising a product's value to the customer.

SUMMARY

This specification describes technologies relating to improving the impact of digital media.

In general, one innovative aspect of the subject matter described in this specification can be embodied in methods that include the act of providing a non-affiliated advertisement to a plurality of users. The methods include the act of receiving indications that a subset of the plurality of users have viewed the non-affiliated advertisement. The methods include the act of creating a control group for an advertisement from the subset of the plurality of users that received the non-affiliated advertisement.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Each indication of the indications may be associated with a user and each indication includes an identifier associated with the corresponding user. Each indication may be generated by at least one of a callback link or a conversion pixel provided with the non-affiliated advertisement. The methods may include the act of attributing a difference between a transaction rate for users in the control group and a transaction rate for users not in the control group to the advertisement. The method may include the act of providing the advertisement and the identifiers in the control group to an advertising system. The methods may include the act of adjusting a marketing campaign based on the attributed difference.

Particular embodiments of the subject matter described in this specification can be implemented so as to realize one or more of the following advantages. The impact of a digital marketing campaign can be determined. Marketing campaigns can be improved over time. Financial and computer processing resources can be conserved by eliminating ineffective marketing campaign.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Lift over control is an experiment based methodology. A group of potential recipients is divided into two groups, a test group and the control group. The test group receives the marketing material. The control group does not. For example, a marketing campaign may identify 100,000 customers who meet the profile of individuals to receive the marketing material (for example, they may share common demographic, educational, professional, and/or regional characteristics). A test group may be made up of 90,000 of the 100,000 customers. The test group may receive the marketing material (for example, a direct mailing). The control group may be made up of the remaining 10,000 of the 100,000 customers. The control group does not receive the marketing material. Both the test group and the control group may be exposed to other marketing campaigns, so long as the test group and the control group are exposed (in aggregate) to the same other marketing campaigns. The response rate of members of the test group and the control group are compared. Differences in the response may be attributed to the marketing campaign. This enables a marketing group or system to make informed decisions about how to spend their limited resources.

Successful application of a lift over control system requires the identification of a control group. The current implementations around advertisement delivery on the Internet do not provide a mechanism to generate a control group. In general, creating a control group requires an understanding of whom may see the advertisement and the ability to limit the distribution of the advertisement to a subset of that group. Without being able to identify individual users a control group cannot be formed.

Figure 1:
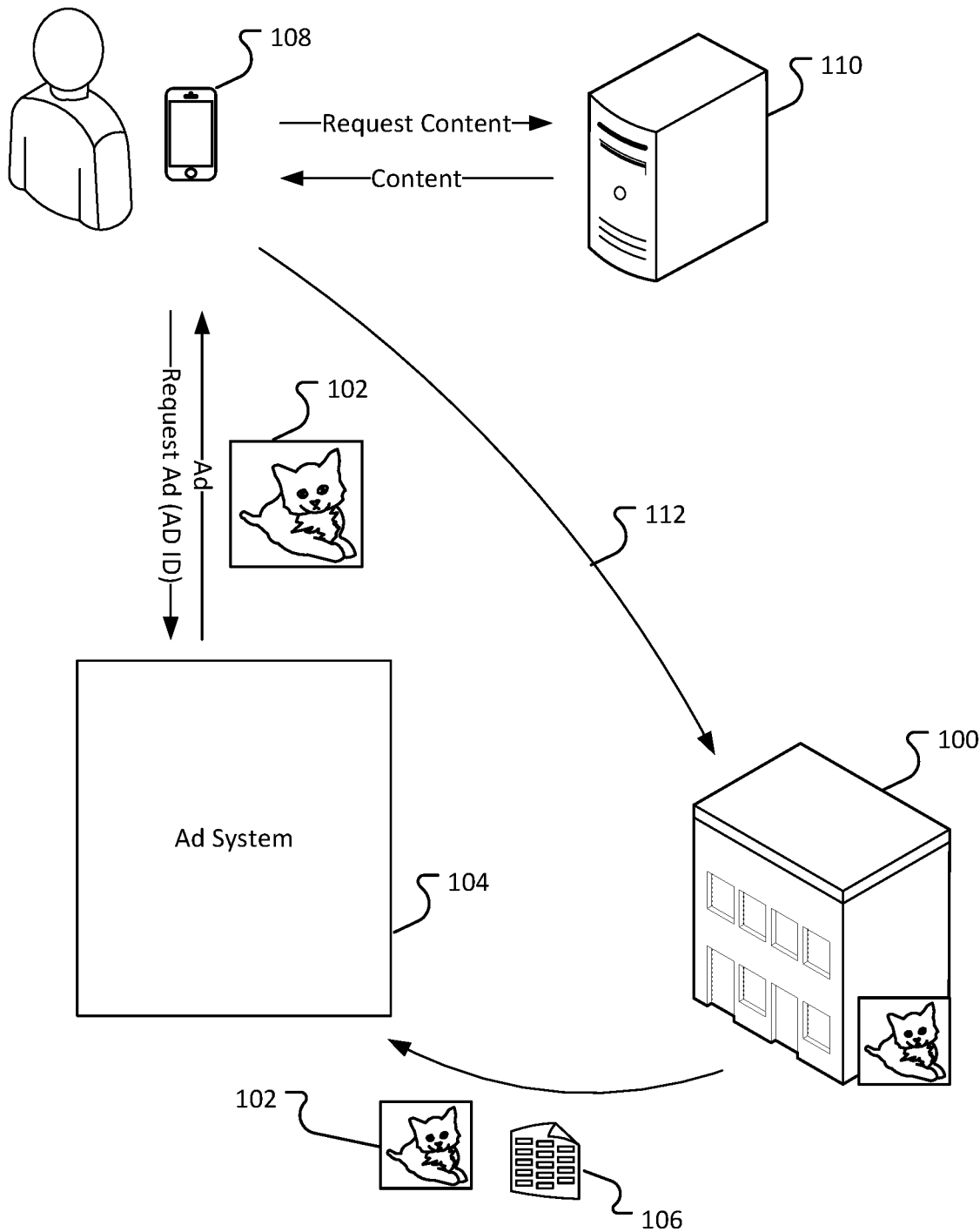
FIG. 1 illustrates an example of a user viewing an advertisement.

FIG. 1 illustrates an example of a user viewing an advertisement. A company 100 may provide an advertisement 102 to an advertising system 104. In general, an advertising system is any system that is configured to supply advertisements provided from one or more entities (e.g. companies, institutions, individuals, etc.) to end users. As discussed further below, an advertisement system 104 may be contain multiple different components systems each operated by one or more different entities. The advertisement system 104 stores the advertisement 102. In some implementations, the company 100 can provide targeting information 106 along with the advertisement. The targeting information 106 can include details about the users that the company wishes to view the advertisement. For example, the target information 106 can include demographic information (such as age range, gender, income, education level, military service, political affiliation, etc.). The advertisement 102 may be part of a larger marketing campaign. In general, a marketing campaign refers to a strategy of presenting one or more advertisements for a predetermined period of time.

A user of a user device 108 requests content (such as a web page, video, image, etc.) from a content provider 110. The user device 108 may be any device capable of requesting and receiving content from a content publisher and an ad system. Examples of user devices include, but are not limited to, computers, smart phones, tablets, personal digital assistants, wearable technology, etc. The content provider 110 provides the requested content to the user 108. Within the requested content is the capability to display an advertisement. The advertisement may be displayed along with the content. Examples of advertisements include, for example, pre-rolls to videos, banner advertisements, search advertisements, newsletter advertisements, etc.

The user device 108 receives the content and requests an advertisement from the advertisement system 104. In some implementations, the user device 108 may send an user identifier or other information about the user to the advertisement system 104.

The advertisement system 104 provides an advertisement 102 (which corresponds to the advertisement 102 provided by the company 100) to the user device 108. The advertisement 112 is then displayed to the user along with the content.

If, subsequently, the user contacts the company 100 (as represented by the arrow 112). The company does not have a way to determine whether the user has viewed the particular advertisement. Further, without knowing which users may be presented with the advertisement (with the exception of the general information in the target information 106) the company cannot create a control group to measure the effectiveness of the advertisement 102.

Figure 2:
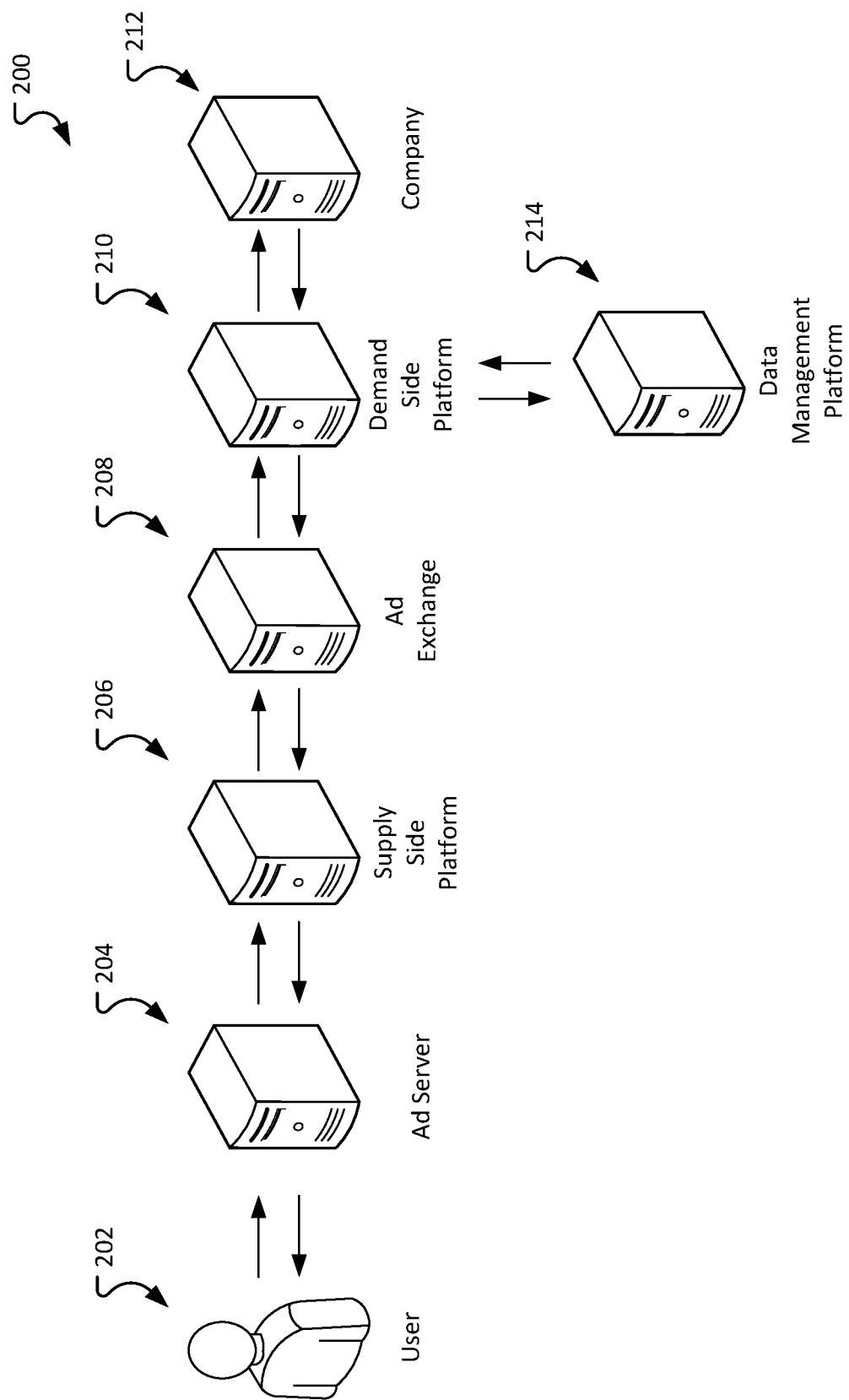
FIG. 2 describes the functioning of the advertising system.

FIG. 2 describes the functioning of the advertising system. The selection and presentation of an online advertisement can include multiple different entities. Ad space may be offered for sale in a bidding market using an ad exchange and real-time bidding. For example, after receiving the requested content, the user's computer system may contact an ad server 204. The ad server 204 can provide content provider and user identifying information to a supply-side platform server 206.

Broadly speaking, there are three types of data that can be obtained through a data management platform. For example, first party data includes data describing a customer's behaviors, actions or interests. Second party data can refer to a combination of statistics related to cookie pools on external publications and platforms. Third party data can be sourced from external providers and often aggregated from numerous websites.

The customer information is presented in an offer of ad space. The supply side platform 206 can send the offer to an ad exchange 208. The ad exchange 208 puts the offer out for bid to demand-side platforms 210. Demand side platforms 210 have ads ready to display, and are searching for users to view them. Companies 212 get the information about the user ready to view the ad, and decide, based on that information, how much to offer to buy the ad space. The user's identifying information can be provided to the demand side platform by a data management platform 214. At the data management platform 214, the user's identifying information can be used to identify demographic information, previous purchases, and other information of interest to advertisers.

The ad exchange 208 then passes the link to the ad back through the supply side platform 206 and the ad server 204 to the user device 202. However, because the companies 212 are not directly placing the advertisement, their ability to tailor the advertisement presentation is limited.

Figure 3:
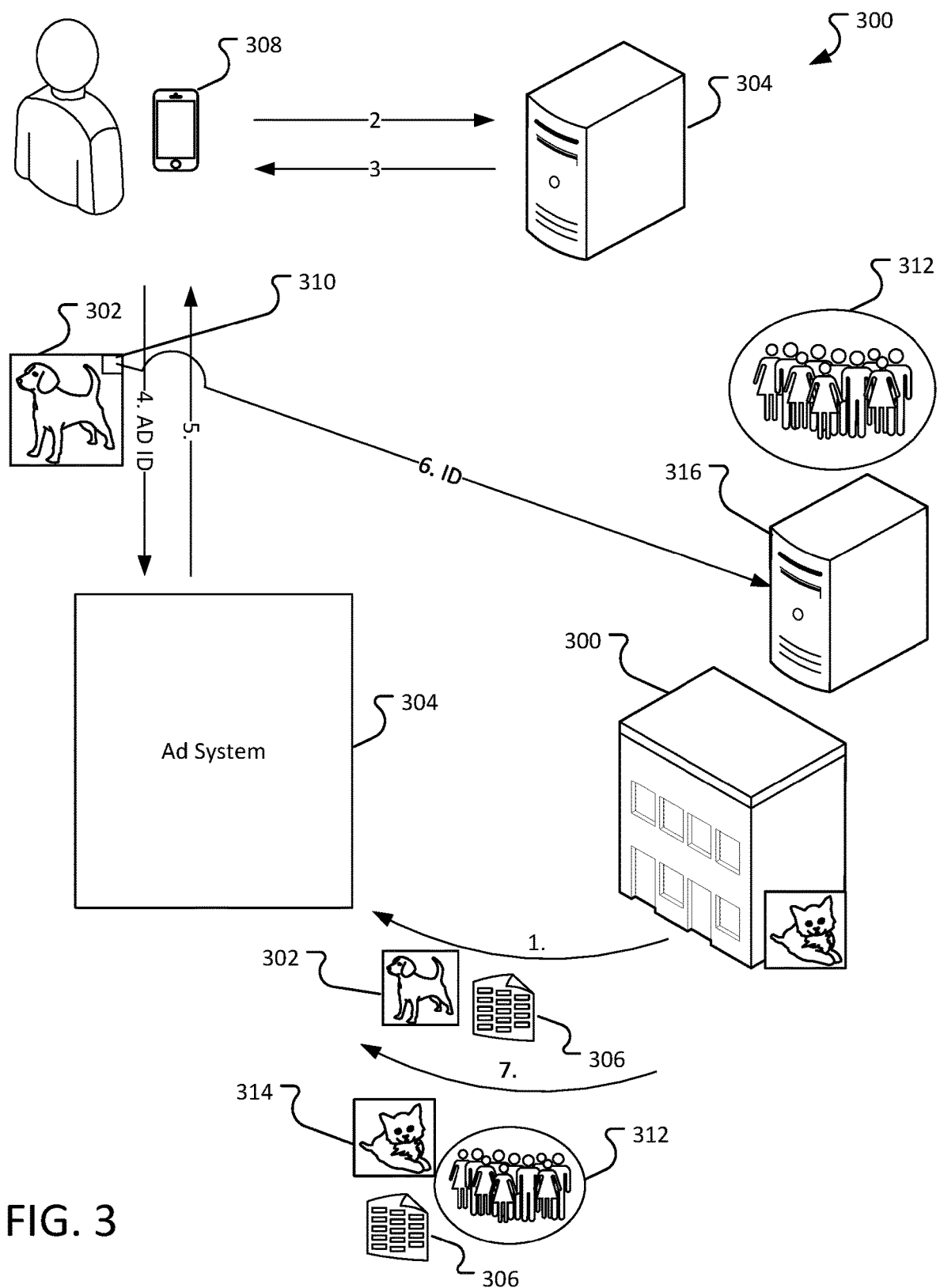
FIG. 3 illustrates an environment for creating a control group based on a non-affiliated advertisement.

FIG. 3 illustrates an environment for creating a control group based on a non-affiliated advertisement. A company 300 may provide an unaffiliated advertisement 302 to an advertising system 304. The company 300 may provide target information 306 with the unaffiliated advertisement 302. The targeting information can include details about the users that the company wishes to view a future advertisement.

At some time, a user of a user device 308 requests content (such as a web page, video, image, etc.) from a content provider 304. The user device 308 may be any device capable of requesting and receiving content from a content publisher and an ad system, as described above. The content provider 304 provides the requested content to the user 308. Within the requested content is the capability to display an advertisement.

The user device 308 receives the content and requests an advertisement from the advertisement system 304. In some implementations, the user device 308 may send a user identifier or other information about the user to the advertisement system.

In this example, the advertisement system 304 provides the unaffiliated advertisement 302 to the user device 308. The unaffiliated advertisement 302 is then displayed to the user along with the content.

The unaffiliated advertisement 302 may include the ability to perform a callback to the company 300. For example, by using a single pixel image that is sourced from a data management platform 316 associated with the company 300. The callback can include information about the user that enables the company 300 to identify individual users, generally. For example, the system may enable the company to identify a user without exposing personally identifiable information of the user. For example, the company may identify a cookie or other similar identifier without identifying, for example, the name of the user.

The data management platform 316 can create a record that a particular user identifier as viewed the unaffiliated advertisement. Over a period of time, the system can collect a list of multiple such users. The list of users can be used to create a control group 312 for a future advertisement.

Once a control group has been identified the system can provide the advertisement 314 along with the target information 306 and the control group 312, where the control group identifies users who should not receive the advertisement 314.

Figure 4:
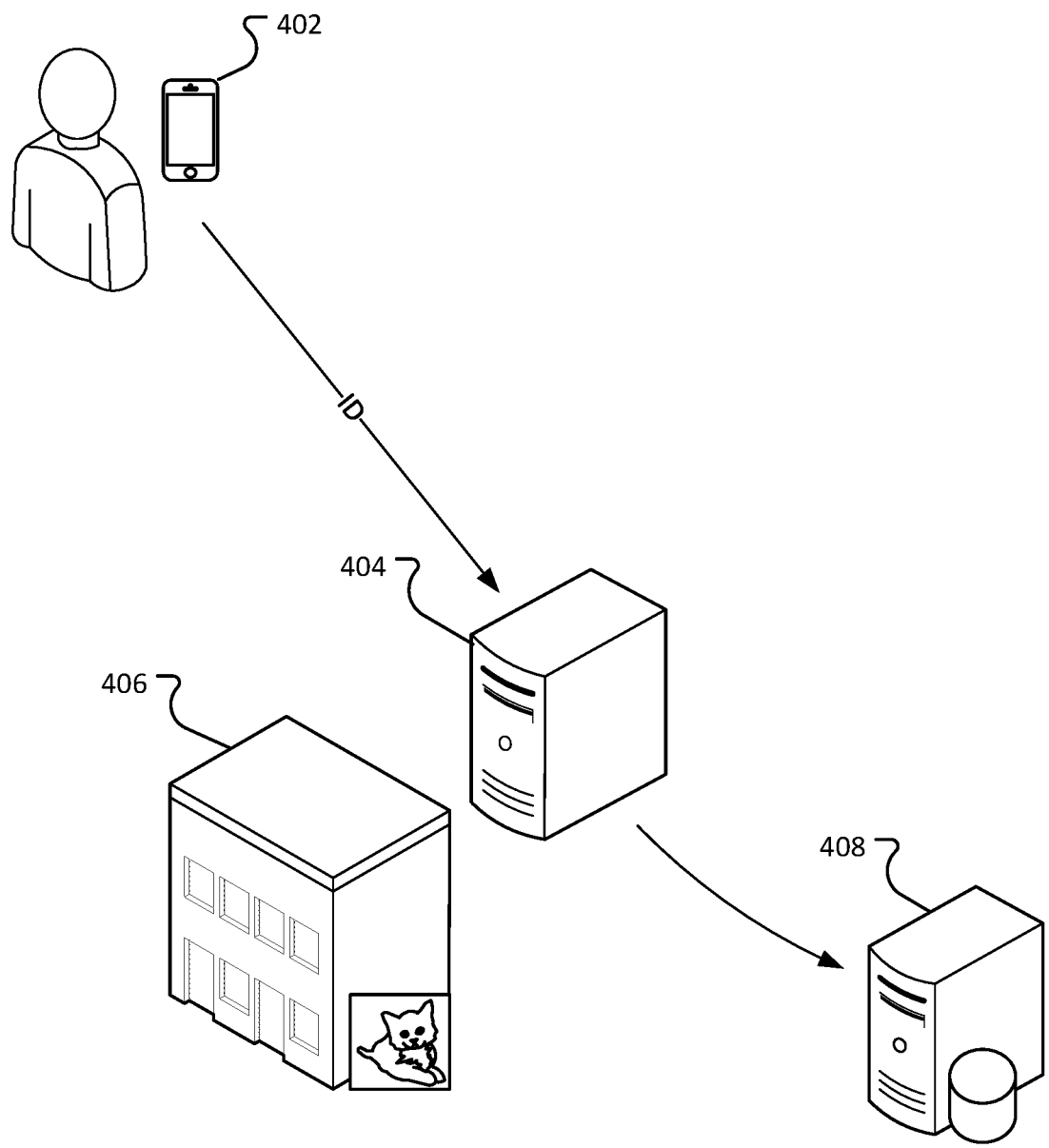
FIG. 4 illustrates a user interacting with a company's website.

FIG. 4 illustrates a user interacting with a company's website. A user device 402 accesses the web server 404 of the company 406. The user device 402 communicates an identifier to the web server 404. The identifier may be, for example, the identifier associated with the non-affiliated advertisement 302 of FIG. 3. Alternatively, the identifier may be associated with an ad system 304. In general, the identifier may enable a system of the company (for example, an analytic server 408) to make a determination as to whether the user of the user device 402 has been presented with a targeted advertisement.

The user may contact the company in order to complete a transaction, for example, the user may be responding to a call to action in the advertisement. Examples of transactions include, but are not limited to, purchasing a product, performing account maintenance, etc.

While it is not be possible to conclusively determine conclusively that the user has not viewed an advertisement (for example, a user may switch user devices, may view the advertisement on a different user device associated, may have deleted cookies, etc.), the system can determine whether an identifier is associated with an indication that the user is part of the control group or that the user has been presented with the advertisement. As the control group (who viewed the non-affiliated advertisement) and the test group (who did not) are subjected to similar types of errors/noise the determination of the marketing analysis remains valid.

Information associated with the user, advertisement views, and transactions may be stored in an analytic server 408. The analytic server can analyze the transactions from multiple users over a predetermined period of time. The analytic server can compare the rate that a particular transaction is performed by user's who viewed an advertisement (generally referred to as the advertising group) to the rate that the particular transaction is performed by users in the control group. Differences in the rate of advertising group to the rate of the control group can be attributed to the advertisement.

Figure 5:
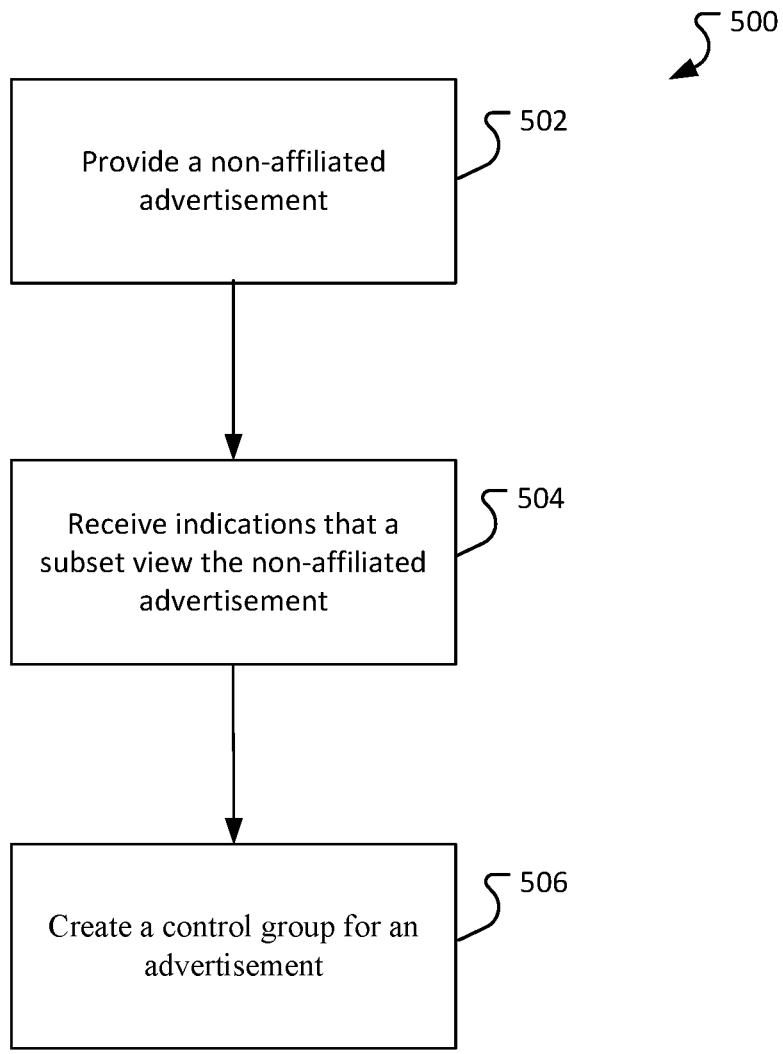
FIG. 5 is a flow chart of a process for generating a control group using a non-affiliated advertisement.

FIG. 5 is a flow chart of a process 500 for generating a control group using a non-affiliated advertisement.

The process 500 provides 502 a non-affiliated advertisement to a plurality ofusers; receiving indications that a subset of the plurality of users have viewed the non-affiliated advertisement. A non-affiliated advertisement can be, for example, a public service message, an advertisement for an unrelated service, or any other advertisement that targets the target audience of the advertisement for while the control group is to be created. creating a control group for an advertisement from the subset of the plurality of users that received the non-affiliated advertisement.

The process 500 receives 504 indications that a subset of users have viewed the non-affiliated advertisement. The indication may include, for example, information that can identify a particular user or user device. For example, the indication may include cookie information, MAC address information, Internet Protocol Addresses, and/or browser fingerprints.

The process 500 creates 506 a control group for an advertisement. Users who view the non-affiliated advertisement may be included in a control group. The control group is excluded from receiving the advertisement.

In some implementations, the system can track a response rate or conversion rate for users in the control group and users who are not in the control group. Differences between the response or conversion rates may be attributed to the advertisement. For example, if members of the control group have a three percent response rate and individuals not in the control group have a five percent response rate, then the process may determine that the advertisement provided a 66 percent lift (e.g. an increase of 2%).

Using the attributed information, a system may adjust a marketing campaign. For example, if an advertisement is not providing any significant lift then the marketing campaign may be stopped prior to the expected end of the campaign. If the advertising campaign is providing a large lift, then the marketing campaign may be extended, or the marketing campaign may be expanded to reach a wider audience. The determination to terminate in marketing campaign saves not only the cost associated with running the campaign, but also improves the performance of the computer as storage space, bandwidth, and central processing resources associated with providing, displaying, and tracking the advertisement do not need to be expended.

In some implementations, the system may perform a cost/benefit analysis to determine whether the extra revenue/profit generated due to the lift associated with the advertisement provides a sufficient return on investment as compared to the cost of running the advertisement. The cost/benefit analysis is not necessarily a simple determination as to whether or not the cost of the advertisement is equal to or greater than the increased revenue/profit attributed to the advertisement. Instead, in some implementations, the system may use a cost of capital to determine whether to continue or terminate a marketing campaign. The cost of capital refers to the opportunity cost of making a specific investment. It is the rate of return that could have been earned by putting the same money into a different marketing campaign.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method of creating a control group for determining effectiveness of a target advertisement, the method comprising:

transmitting, by at least one processor, advertisement data representing a non-affiliated advertisement to a plurality of user devices;

identifying one or more users of one or more user devices who did not view the non-affiliated advertisement;

generating, by at least one processor, control group data for a target advertisement, the control group data comprising data representing the one or more user devices being assigned to a test group;

transmitting, by at least one processor and to the one or more user devices assigned to the test group, the target advertisement;

monitoring transactions of users whose devices are assigned to the test group and users whose devices are not assigned to the test group to determine an average conversion rate of the users whose devices are assigned to the test group and of the users whose devices are not assigned to the test group; and computing a lift value based on a percentage difference between the average conversion rate of the users whose devices are not assigned to the test group and the average conversion rate of the users whose devices are assigned to the test group.

2. The computer-implemented method of claim 1, wherein the advertisement data comprises a callback function that, when executed by a user device of the plurality of user devices that is configured to receive the advertisement data, causes that user device to transmit, to at least one processor, callback data indicating that a user of that user device has viewed the non-affiliated advertisement and comprising identification data of that corresponding user.

3. The computer-implemented method of claim 2, wherein the identification data comprises a cookie.

4. The computer-implemented method of claim 1, wherein transmitting the advertisement data comprises transmitting the advertisement data to an advertising system.

5. The computer-implemented method of claim 1, wherein the non-affiliated advertisement is a public service message or an advertisement for a service unrelated to a service promoted in the target advertisement.

6. The computer-implemented method of claim 1, wherein the advertisement data representing the non-affiliated advertisement is transmitted in response to a request for the advertisement data from each of the plurality of user devices.

7. The computer-implemented method of claim 1, further comprising adjusting a marketing campaign based on the lift value.

8. The computer-implemented method of claim 7, wherein adjusting a marketing campaign comprises performing an analysis to determine whether revenue generated due, at least in part, to the non-affiliated advertisement provides a desired return on investment compared to costs associated with the non-affiliated advertisement.

9. A non-transitory computer storage medium encoded with computer program instructions that when executed by one or more computers cause the one or more computers to perform operations for determining effectiveness of a target advertisement, the operations comprising:

transmitting advertisement data representing a non-affiliated advertisement to a plurality of user devices;

identifying one or more users of one or more user devices who did not view the non-affiliated advertisement;

generating control group data for a target advertisement, the control group data comprising data representing the one or more user devices being assigned to a test group;

transmitting the target advertisement to the one or more user devices assigned to the test group;

monitoring transactions of users whose devices are assigned to the test group and users whose devices are not assigned to the test group to determine an average conversion rate of the users whose devices are assigned to the test group and of the users whose devices are not assigned to the test group; and computing a lift value based on a percentage difference between the average conversion rate of the users whose devices are not assigned to the test group and the average conversion rate of the users whose devices are assigned to the test group.

10. The non-transitory computer storage medium of claim 9, wherein the advertisement data comprises a callback function that, when executed by a user device of the plurality of user devices that is configured to receive the advertisement data, causes that user device to transmit callback data indicating that a user of that user device has viewed the non-affiliated advertisement and comprising identification data of that corresponding user.

11. The non-transitory computer storage medium of claim 10, wherein the identification data comprises a cookie.

12. The non-transitory computer storage medium of claim 9, wherein the non-affiliated advertisement is a public service message or an advertisement for a service unrelated to a service promoted in the target advertisement.

13. The non-transitory computer storage medium of claim 9, wherein the operations further comprise adjusting a marketing campaign based on the lift value.

14. A system comprising:

one or more computers and one or more storage devices storing instructions that, when executed by the one or more computers, cause the one or more computers to perform operations for determining effectiveness of a target advertisement, the operations comprising:

transmitting advertisement data representing a non-affiliated advertisement to a plurality of user devices;

identifying one or more users of one or more user devices who did not view the non-affiliated advertisement;

generating control group data for a target advertisement, the control group data comprising data representing the one or more user devices being assigned to a test group;

transmitting the target advertisement to the one or more user devices assigned to the test group;

monitoring transactions of users whose devices are assigned to the test group and users whose devices are not assigned to the test group to determine an average conversion rate of the users whose devices are assigned to the test group and of the users whose devices are not assigned to the test group; and computing a lift value based on a percentage difference between the average conversion rate of the users whose devices are not assigned to the test group and the average conversion rate of the users whose devices are assigned to the test group.

15. The system of claim 14, wherein the advertisement data comprises a callback function that, when executed by a user device of the plurality of user devices that is configured to receive the advertisement data, causes that user device to transmit, to at least one processor, callback data indicating that a user of that user device has viewed the non-affiliated advertisement and comprising identification data of that corresponding user.

16. The system of claim 15, wherein the identification data comprises a cookie.

17. The system of claim 14, wherein the non-affiliated advertisement is a public service message or an advertisement for a service unrelated to a service promoted in the target advertisement.

18. The system of claim 14, wherein the advertisement data representing the non-affiliated advertisement is transmitted in response to a request for the advertisement data from each of the plurality of user devices.

19. The system of claim 14, wherein the operations further comprise adjusting a marketing campaign based on the lift value.

20. The system of claim 19, wherein adjusting a marketing campaign comprises performing an analysis to determine whether revenue generated due, at least in part, to the non-affiliated advertisement provides a desired return on investment compared to costs associated with the non-affiliated advertisement.

\* \* \* \* \*